3,047,605
PHOSPHONIC ACID ESTERS AND THEIR PRODUCTION
Gerhard Schrader, Wuppertal-Cronenberg, Germany, assignor to Farbenfabriken Bayer Aktiengesellschaft, Leverkusen, Germany, a corporation of Germany
No Drawing. Filed May 20, 1958, Ser. No. 736,465
Claims priority, application Germany June 5, 1957
11 Claims. (Cl. 260—461)

The present invention relates to and has as its objects new and useful insecticidal phosphonic acid esters and their production. Generally the new compounds may be represented by the following formula

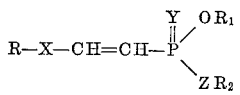

in which R and $R_1$ stand for alkyl radicals, $R_2$ stands for aliphatic, araliphatic or aromatic radicals which furthermore may be substituted, and X, Y or Z stand for oxygen or sulfur.

There are many ways of preparing the inventive compounds. Thus, if phosphonic or thionophosphonic acid esters are desired the following way may lead to that part of the inventive compounds. Vinylalkyl ethers or mercaptans are known to add on phosphorus pentachloride easily. The adducts thus formed may then be reacted with sulfurous acid to form the corresponding dichlorides:

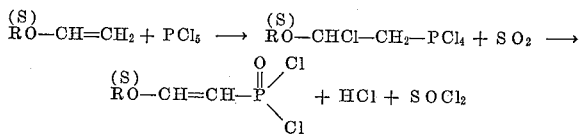

These β - alkoxy - (or β-alkylmercapto-)-vinyl-phosphonic acid dichlorides thus formed may be further converted by known methods i.e. by reacting with convenient alcohols to corresponding dialkyl esters of the following general formula

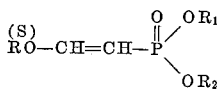

These β - alkoxy - (or β-alkylmercapto-)-vinyl-phosphonic acid dialkyl esters may be converted by known methods with the aid of phosgene into the corresponding β - alkoxy - (or β-alkylmercapto-)-vinyl-phosphonic acid ester chlorides:

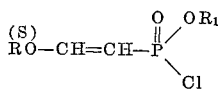

The above shown adducts of phosphorus pentachloride and β-alkoxy-(or β-alkylmercapto-)-vinyl-ethers may be reduced with hydrogen sulfide so as to form β-alkoxy-(or β-alkylmercapto-)-vinyl-thionophosphonic acid dichlorides:

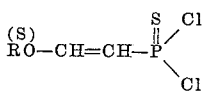

These easily obtainable dichlorides may also be converted with appropriate alcohols by known methods into the corresponding β-alkoxy-(or β-alkylmercapto-)-vinyl-thionophosphonic acid alkyl ester chlorides:

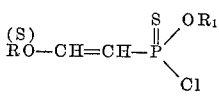

These β - alkoxy - (or β-alkylmercapto-)-vinyl-phosphonic acid alkyl ester chlorides or β-alkoxy-(or β-alkylmercapto-)-vinyl thionophosphonic acid alkyl ester chlorides can be condensed with any alcohols or phenols to form the hitherto unknown esters which distinguish themselves by a very good contact-insecticidal action:

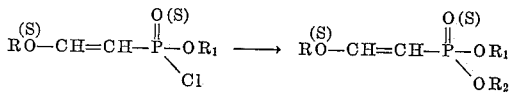

In all these above shown formulae R and $R_1$ and $R_2$ have the first menitoned significance.

The condensation of these phosphonic acid or thiophosphonic acid chlorides with alcohols or phenols may be carried out in the presence of suitable acid-binding agents. As acid-binding agents there are preferably used tertiary amines in the presence of inert solvents, at room temperature or slightly elevated temperature. When condensing phenols, it is also possible to start from the alkali metal salts of the phenols or from the phenols themselves and to bind the halogen with alkali metal carbonates. In the condensation of phenols with β-alkoxy-(or β-alkylmercapto-)vinyl-phosphonic acid- or -thionophosphonic acid ester chlorides, ketones have primarily proved to be particularly useful solvents (especially methyl ethyl ketone and methyl isobutyl ketone).

If thiolphosphonic acid esters are desired β-alkoxy-(or β-alkylmercapto-)vinylphosphonic acid ester chlorides as described in the foregoing paragraph can be reacted with any aliphatic, aliphatic-aromatic or aromatic mercaptans so as to form likewise new β-alkoxy-(or β-alkylmercapto-)-vinyl-phosphonic acid thiolesters of the following formula

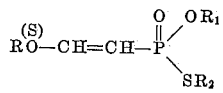

In another way the β-alkoxy-(or β-alkylmercapto)-vinyl-thionophosphonic acid dichlorides also described in the first paragraph can be converted as described above into the corresponding thionophosphonic acid monochlorides.

When saponifying these β-alkoxy-(or β-alkylmercapto-)-vinyl-thionophosphonic acid monochlorides with alkaline reacting compounds chlorine is eliminated with the formation of the corresponding β-alkoxy-(or β-alkylmercapto-)-vinyl-thionophosphonic acid.

These new thionophosphonic acids react, however, in the tautomeric Form II:

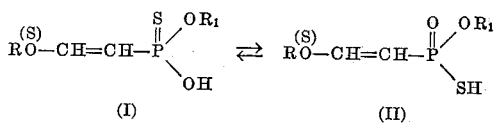

(I)        (II)

It has now been found that aliphatic, aliphatic-aromatic and in some cases also aromatic halides which may be substituted react with the Form II in such a manner that β-alkoxy-(or β-alkylmercapto-)vinyl-thiolphosphonic acid esters of the general formula

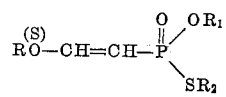

are formed. These β-alkoxy-(or β-alkylmercapto-)-vinyl-thiolphosphonic acid esters are identical with the compounds obtainable by the first mentioned process.

When working according to the first described method for producing thiolphosphonic acid derivatives the reaction usually should be carried out at slightly elevated temperatures say up to about 50 to 70° C. The mercaptans are converted before reaction in their corresponding salts either by reaction of alkali metals in suitable inert organic solvents such as benzene or toluene or by the reaction of alkali metal alcoholates also in suitable inert solvents; in this case especially lower ketones such as acetone or methyl ethyl ketone are most workable. If working according to the second described method for producing thiolphosphonic acid esters the saponifying of the thionoester chlorides should be carried out usually with strong alkaline reactants such as e.g. potassium hydroxide. Without isolating the intermediates then the corresponding substituted halide is added. Reaction usually is carried out also in this case at elevated temperatures say up to about 100° C. and using suitable inert organic or aqueous organic solvents.

Also these new thiolphosphonic acid esters distinguish themselves by an outstanding insecticidal action. The new compounds have chiefly a systemic action.

If dithio-compounds are desired, the aforementioned β-alkoxy-(or β-alkylmercapto-)-vinyl-thionophosphonic acid alkyl ester monochlorides are reacted with salts of any aliphatic, aliphatic-aromatic or aromatic mercaptans so as to form β-alkoxy-(or β-alkylmercapto-)-vinyl-dithiophosphonic acid esters of the following general formula

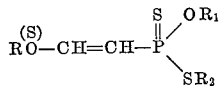

The condensation of the β-alkoxy-(or β-alkylmercapto-)-vinyl-thionophosphonic acid monochlorides with mercaptans is expediently carried out so that alkali metal alcoholates, especially sodium ethylate is used as an acid-binding agent. In this case most of the desired thiol esters are obtained nearly quantitatively without the formation of the corresponding oxygen esters as by-products.

The condensation can expediently be carried out at a slightly elevated temperature, for example at 20–40° C., if desired also in the presence of suitable inert solvents.

Also these dithio-products distinguish themselves by a good contact-insecticidal action. The new esters are especially effective against red spiders and have chiefly an acaricidal action. They are moreover also suitable for killing caterpillars of various species.

The new compounds of the present invention very effectively kill insects like flies, mites, aphids, etc. They distinguish themselves especially by a good contact-insecticidal activity and at the same time by an activity on eating insects such as caterpillars. Most surprisingly they are of remarkable low toxicity against mammals. They may be used in the same manner as other known phosphoric insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned, water (if necessary with a commercial emulsifier), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

The insecticidal activity of the inventive compounds may be seen from the following test results.

Aqueous dilutions of the following compounds

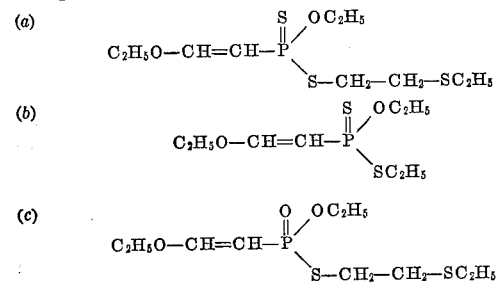

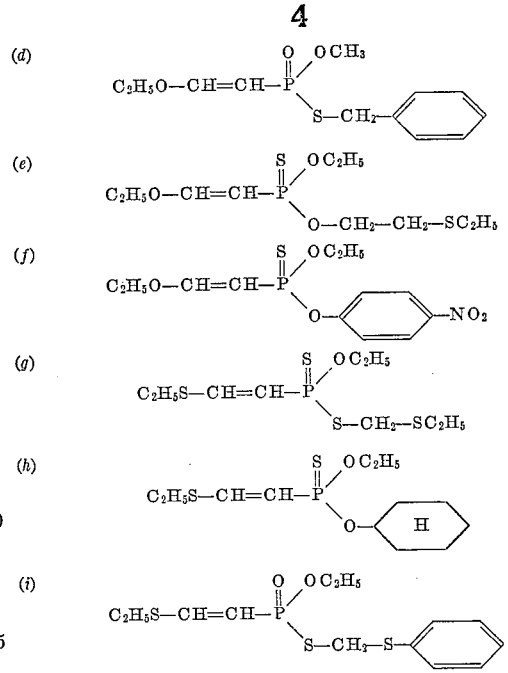

have been prepared by mixing the active ingredient with the same amount of dimethyl formamide as an auxiliary solvent adding thereafter 20% by weight referred to active ingredient of a commercial emulsifier consisting of a benzyl hydroxy polyglycol ether containing about 10 to 15 glycol residues, and diluting at last this premixture with water to the desired concentration indicated in the following paragraphs. The tests have been carried out in the following manner:

Against aphids (contact-insecticidal action) of the type doralis fabae (with compounds (a), (c), (d), (f), (g), (h), and (i)). Heavily infested bean plants (Vitia faba) have been sprayed drip wet with solutions as prepared above. The effect has been determined by evaluation after 24 hours by counting the dead pests either on the surface of the soil or still remaining on the plants;

With compounds (a), (g), and (i): solutions of 0.01% kill aphids 100%,
With compounds (d) and (f): solutions of 0.001% kill aphids 100%,
With compounds (h): solutions of 0.1% kill aphids 100%;

Against caterpillars (with compound (b)). White cabbage has been sprayed drip wet with 0.1% aqueous emulsions as prepared above. Caterpillars of the type diamond back moth (10 each) have been placed on the sprayed leaves of the white cabbage. The living status has been determined after 24 and 48 hours, and complete killing has been obtained;

Against spider mites (contact-insecticidal action) of the type species Tetranychus telarius (two spotted spider) (with compounds (c), (d), and (e)). Bean plants (Phaseolus vulgaris) of about 15 inches height are sprayed drip wet with solutions prepared as indicated above. The bean plants have been infested heavily with the two spotted spider. Evaluation has been carried out after 24 hours, 48 hours and 8 days;

With compounds (c) and (e): solutions of 0.01% kill spider mites 100%,
With compound (d): solutions of 0.001% kill spider mites 90%;

Against flies (Musca domestica) (with compounds (g), (h), and (i)). About 50 flies were placed under covered Petri dishes in which drip wet filter paper has been placed which is sprayed with an insecticidal solution as prepared above. The living status of the flies has been determined after 24 hours;

With compounds (g) and (i): solutions of 0.01% kill flies 100%,

With compound (h): solutions of 0.1% kill flies 100%.

Further activities of the inventive compounds are to be found in the following examples, which are given by way of illustration only without, however, limiting the present invention thereto.

*Example 1*

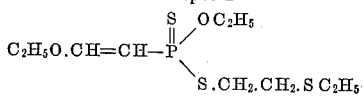

25 grams of β-ethylmercaptoethylmercaptan (B.P. 67° C./12 mm. Hg) are dissolved in 100 millilitres of anhydrous alcohol. A sodium ethylate solution containing 0.2 mol of sodium is added thereto at about 30° C. The mixture is after-stirred at 30 C. for a half hour and 45 grams of β-ethoxyvinylethylthionophosphonic acid monochloride (B.P. 60° C./0.01 mm. Hg) are then added dropwise with further stirring at 30° C. The mixture is after-stirred at 30° C. for an hour, then poured into 300 millilitres of water, the separated oil is taken up in 200 millilitres of benzene and the benzenic solution is washed twice with 50-millilitre portions of water. The benzenic solution is then dried over sodium sulphate. After distilling off the solvent, the residue is fractionated. 46 grams of the new ester of B.P. 118° C./0.01 mm. Hg are thus obtained. Yield: 77 percent of the theoretical. The new ester is a pale yellow water-insoluble oil.

The new ester shows a toxicity on rats per os of about 25 milligrams per kilogram. Aphides are still killed completely at a concentration of 0.01 percent. Spider mites are completely killed even at a concentration of 0.001 percent. 0.1 percent solutions show a complete systemic action. Moreover, 0.1 percent solutions kill caterpillars with certainty. 0.1 percent solutions also have a positive ovicidal action on the ovae of red spiders.

*Example 2*

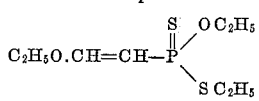

13 grams of ethylmercaptan are dissolved in 60 millilitres of anhydrous alcohol. A sodium ethylate solution containing 0.2 mol of dissolved sodium is added thereto dropwise with stirring at 30° C. 45 grams of β-ethoxy-vinylethyl-thionophosphonic acid monochloride are then added with further stirring at 30° C. The mixture is after-stirred for an hour and then worked up as described in Example 1. 43 grams of the new ester of B.P. 90° C./0.01 mm. Hg are thus obtained. Yield: 88 percent of the theoretical. The new ester is a colourless water-insoluble oil. The new ester shows a toxicity on rats per os of 100 milligrams per kilogram. 0.1 percent solutions kill caterpillars completely.

*Example 3*

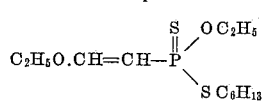

24 grams of n-hexylmercaptan are dissolved in 50 millilitres of anhydrous alcohol. A sodium ethylate solution containing 0.2 mol of dissolved sodium are added thereto at 30° C. 45 grams of β-ethoxyvinylethyl-thionophosphonic acid monochloride are added thereto dropwise with stirring at 30° C. and the mixture is heated to 30–35° C. for a further 2 hours. The product is then worked up as described in Example 1, and 52 grams of the new ester are thus obtained which distills under a pressure of 0.01 mm. Hg at 105° C. without decomposition. Yield: 88 percent of the theoretical. The ester is a colourless water-insoluble oil. The ester shows a toxicity on rats per os of 5 milligrams per kilogram. 0.1 percent solutions kill red spiders completely.

*Example 4*

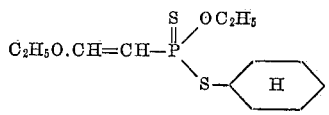

24 grams of cyclohexylmercaptan are dissolved in 50 millilitres of anhydrous alcohol. A sodium ethylate solution containing 0.2 mol of dissolved sodium is added dropwise thereto at 30° C. 45 grams of β-ethoxyvinyl-ethylthionophosphonic acid monochloride are added dropwise with further stirring at 30° C. and the mixture is heated to 35–40° C. for a further 2 hours. The product is then worked up as described in Example 1, and 42 grams of the new ester of B.P. 120° C./0.01 mm. Hg. are thus obtained. Yield: 72 percent of the theoretical. The new ester is a pale yellow water-insoluble oil which shows a toxicity on rats per os of 250 milligrams per kilogram. 0.1 percent solutions kill caterpillars completely.

*Example 5*

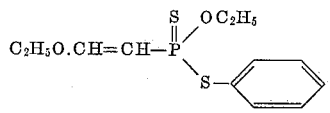

22 grams of thiophenol are dissolved in 50 millilitres of anhydrous alcohol. A sodium ethylate solution containing 0.2 mol of dissolved sodium is added thereto with stirring at 30° C. 45 grams of β-ethoxyvinylethyl-thionophosphonic acid monochloride are then added dropwise with further stirring at 30° C. and the mixture is after-stirred at 40° C. for an hour. After working up as usual, 47 grams of the new ester are obtained which boils under a pressure of 0.01 mm. Hg. at 130 C. Yield: 82 percent of the theoretical.

The new ester shows a toxicity on rats per os of 100 milligrams per kilogram. 0.1 percent solutions kill caterpillars completely. Aphides and spider mites are still completely killed at a concentration of 0.01 percent.

*Example 6*

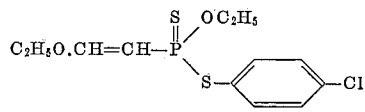

37 grams of p-chlorophenylmercaptan are dissolved in 50 millilitres of anhydrous alcohol. 0.2 mol of a sodium ethylate solution is added thereto dropwise with stirring at 30° C. 45 grams of β-ethoxyvinylethyl-thionophosphonic acid monochloride are then added dropwise with further stirring at 30° C. The mixture is stirred at 35° C. for a further 2 hours and then worked up as described in Example 1. 70 grams of the new ester are thus obtained as a pale yellow water-insoluble oil. On prolonged standing the crude product crystallises in colourless crystals which have a distinct melting point of 50° C.

The ester kills rats per os at 50 milligrams per kilogram. Spider mites are completely killed at a concentration of 0.01 percent. Caterpillars are still killed with certainty by a 0.1 percent aqueous solution.

*Example 7*

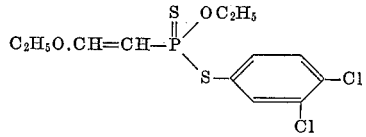

45 grams of 3,4-dichlorophenylmercaptan are dissolved in 120 millilitres of anhydrous alcohol. A sodium ethylate solution containing 0.3 mol of dissolved sodium is added thereto dropwise with stirring at 30° C. To this solution there are added dropwise with further stirring at 30° C.

55 grams of β-ethoxyvinylethyl-thionophosphonic acid monochloride and the temperature is maintained at 40° C. for a further 2 hours. The product is then worked up as described in Example 1. 77 grams of the new ester are thus obtained as a colourless crystalline powder of melting point 68° C. Yield: 87 percent of the theoretical.

The $DL_{50}$ on rats per os is 100 milligrams per kilogram. 0.1 percent solutions kill caterpillars with certainty.

*Example 8*

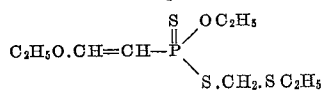

22 grams of α-mercaptomethylthio ethyl ether (B.P. 50° C./12 mm. Hg) are dissolved in 75 millilitres of anhydrous alcohol. A sodium ethylate solution containing 0.2 mol of dissolved sodium is added thereto. 45 grams of β-ethoxy-vinylethyl-thionophosphonic acid monochloride are added thereto dropwise with further stirring at 35° C. and the temperature is kept at 30° C. for a further hour. After working up as usual, 37 grams of the new ester of B.P. 115° C./0.01 mm. Hg are obtained. Yield: 65 percent of the theoretical. The ester is a colourless water-insoluble oil.

$DL_{50}$ on rats per os: 10 milligrams per kilogram.

0.01 percent solutions kill aphids completely. Spider mites are still killed completely at a concentration of 0.001 percent. 0.1 percent solutions have a strong systemic action. Caterpillars are killed with certainty even at a concentration of 0.1 percent. Spider mite ovae are also killed with certainty by 0.1 percent solutions.

By the same way but using instead of β-ethoxy-vinyl-ethyl-thionophosphonic acid monochloride β-ethoxy-vinyl-methyl-thionophosphonic acid monochloride or β-ethoxy-vinylpropyl-thionophosphonic acid monochloride in equimolecular amounts there are obtained the following two compounds:

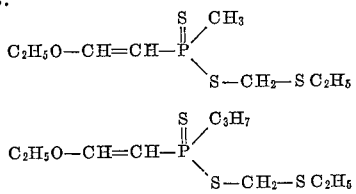

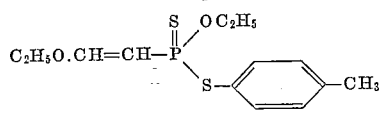

*Example 9*

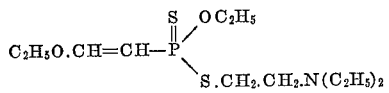

32 grams of p-thiocresol are dissolved in 70 millilitres of anhydrous alcohol. A sodium ethylate solution containing 0.2 mol of dissolved sodium is added thereto, 45 grams of β-ethoxyvinylethyl-thionophosphonic acid monochloride are then added dropwise with stirring and the mixture is after-stirred at 40° C. for 2 hours. After working up as usual, 63 grams of the new ester are obtained. Yield: 84 percent of the theoretical. The new ester is not distillable even under high vacuum.

The new ester kills rats per os at 250 milligrams per kilogram. Flies are still killed with certainty at a concentration of 0.001 percent. Aphides are destroyed with certainty by 0.1 percent solutions.

*Example 10*

$$C_2H_5O.CH=CH-P\begin{matrix}S\\||\end{matrix}\begin{matrix}OC_2H_5\\\\S.CH_2.CH_2.N(C_2H_5)_2\end{matrix}$$

34 grams of β-diethylaminoethylmercaptan (B.P. 54° C./10 mm. Hg) are dissolved in 100 millilitres of methyl-ethyl ketone. A sodium ethylate solution containing 0.25 mol of dissolved sodium is added thereto with stirring. To the solution thus obtained there is added at 30° C.

55 grams of β-ethoxyvinylethyl-thionophosphonic acid monochloride. The mixture is after-stirred at 40° C. for two hours and then worked up in usual manner. 69 grams of the new ester are thus obtained as a yellow water-insoluble oil. Yield: 88 percent of the theoretical. The ester is not distillable even under high vacuum.

*Example 11*

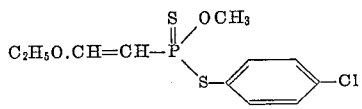

38 grams of p-chlorothiophenol are dissolved in 100 millilitres of methanol. A sodium methylate solution containing ¼ mol of dissolved sodium are added at 30° C. The mixture is after-stirred at 30° C. for a half hour and 53 grams of β-ethoxyvinyl-thionophosphonic acid methyl ester chloride (B.P. 55° C./0.01 mm. Hg) are then added with stirring at the aforesaid temperature. The reaction product is heated at 30–35° C. for a further hour and then poured into plenty of water. The separated oil is taken up with benzene, washed neutral and dried. After distilling off the solvent, 45 grams of the new ester are obtained as a pale yellow water-insoluble oil. Yield: 59 percent of the theoretical.

*Example 12*

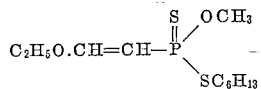

30 grams of n-hexylmercaptan are dissolved in 100 millilitres of methanol. A sodium methylate solution containing ¼ mol of dissolved sodium is added thereto at 30° C. The mixture is after-stirred at 30° C. for a half hour and 53 grams of β-ethoxyvinyl-thionophosphonic acid methyl ester chloride are then added at this temperature. After working up as usual, 36 grams of the new ester are obtained as a colourless water-insoluble oil of B.P. 98° C./0.01 mm. Hg. Yield: 51 percent of the theoretical.

*Example 13*

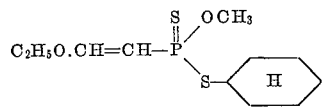

30 grams of cyclohexylmercaptan are dissolved in 100 millilitres of methanol. A sodium methylate solution containing ¼ mol of dissolved sodium is added thereto. At 30° C., 53 grams of β-ethoxyvinyl-thionophosphonic acid methyl ester chloride are added dropwise with stirring. The mixture is stirred at 30–35° C. for an hour and then worked up in uusual manner. 35 grams of the new ester of B.P. 105° C./0.01 mm. Hg are thus obtained. Yield: 50 percent of the theoretical.

*Example 14*

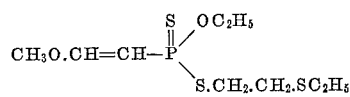

32 grams of β-ethylmercapto-thioethyl ether (B.P. 67° C./12 mm. Hg) are dissolved in 120 millilitres of anhydrous alcohol. A sodium ethylate solution containing ¼ mol of dissolved sodium is added thereto at 30° C. 52 grams of β-methoxyvinyl-thionophosphonic acid ethyl ester chloride (B.P. 55° C./0.01 mm. Hg) are then added dropwise with further stirring at 30° C. The mixture is after-stirred at this temperature for another hour and then worked up in usual manner. 54 grams of the new ester of B.P. 94° C./0.01 mm. Hg are thus obtained. The ester is barely water soluble. Yield: 76 percent of the theoretical. Aphides are completely killed by 0.001 percent suspensions of this ester.

Example 15

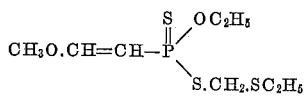

28 grams of α-methylmercapto-thioethyl ether (B.P. 50° C./12 mm. Hg) are dissolved in 120 millilitres of anhydrous alcohol. A sodium ethylate solution containing ¼ mol of dissolved sodium is added thereto. The mixture is after-stirred at 30° C. for 30 minutes and 53 grams of β-methoxyvinyl-thionophosphonic acid ethyl ester chloride are added dropwise at the said temperature. The product is after-stirred for another hour and then worked up in usual manner. 49 grams of the new ester of B.P. 90° C./00.1 mm. Hg are thus obtained as a colourless water-insoluble oil. Yield: 72 percent of the theoretical. Spider mites are still completely killed by 0.0001 percent solutions.

Example 16

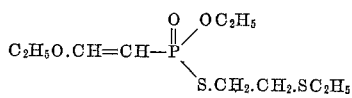

6 grams of finely divided sodium are suspended in 200 millilitres of benzene. 31 grams of β-ethylmercapto-ethylmercaptan (B.P. 67° C./12 mm. Hg) are added thereto with stirring. The mixture is heated to 50° C. for a further 4 hours. To the suspension of sodium mercaptide thus obtained there are added with stirring at 50-60° C. 50 grams of β-ethoxyvinyl-phosphonic acid ethyl ester chloride (B.P. 70° C./0.05 mm. Hg). The mixture is after-stirred at 50° C. for 2 hours and then poured into 200 millilitres of ice-water. The benzenic solution is separated off, washed twice with 50-millilitre-portions of water and dried over sodium sulphate. After distilling off the benzene under vacuum the residue is fractionated. 51 grams of the new ester of B.P. 110° C./0.01 mm. Hg are thus obtained. Yield: 72 percent of the theoretical. The ester is a pale yellow water-insoluble oil.

Example 17

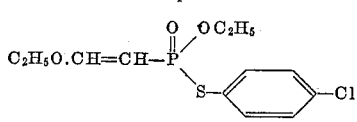

37 grams of p-chlorophenylmercaptan are dissolved in 100 millilitres of ethylmethylketone. A sodium ethylate solution containing 0.25 mol of dissolved sodium is added dropwise with stirring at 30° C. 50 grams of β-ethoxyvinyl-phosphonic acid ethyl ester chloride are then added dropwise at 30° C. The mixture is after-stirred at 30° C. for an hour and then worked up as indicated in Example 1. 70 grams of the new ester are thus obtained as a water-insoluble oil which is not distillable even under vacuum. Yield: 90 percent of the theoretical.

Example 18

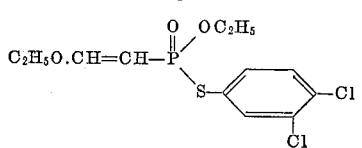

46 grams of 3,4-dichlorophenylmercaptan are dissolved in 100 millilitres of ethylmethylketone. A sodium ethylate solution containing 0.25 mol of dissolved sodium is added dropwise with stirring at 30° C. 50 grams of β-ethoxyvinyl-phosphonic acid ethyl ester chloride are then added with stirring at 30° C. The mixture is kept at 30° C. for another hour and then worked up as described in Example 1. 70 grams of the new ester are thus obtained as a water-insoluble oil which is not distillable even under vacuum. Yield: 82 percent of the theoretical.

Example 19

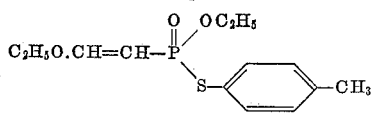

24 grams of p-thiocresol are dissolved in 100 millilitres of ethylmethylketone. A sodium ethylate solution containing 0.2 mol of dissolved sodium are added thereto at 30° C. 40 grams of β-ethoxyvinyl-phosphonic acid ethyl ester chloride are then added dropwise with stirring at 30° C. The mixture is heated at 30° C. for another hour and then worked up in usual manner. 47 grams of a water-insoluble pale yellow oil are thus obtained. Yield: 82 percent of the theoretical.

Example 20

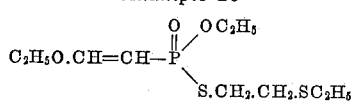

43 grams of β-ethoxyvinyl-thionophosphonic acid ethyl ester chloride (B.P. 60° C./0.01 mm. Hg) are dissolved in 100 millilitres of anhydrous alcohol. 25 millilitres of water are added thereto. 23 grams of potassium hydroxide dissolved in 50 millilitres of water are then added with stirring and the reaction mixture is kept at 70° C. for an hour. 25 grams of β-ethylmercaptoethyl-mercaptan are thereupon added with stirring and the mixture is heated to 75-80° C. for a further 2 hours. After cooling, the reaction mixture is poured into 300 millilitres of water, the separated oil is taken up with 200 millilitres of benzene and the benzene solution is shaken twice with 50-millilitre-portions of a 4 percent sodium bicarbonate solution. The benzene solution is dried over sodium sulphate. The benzene is distilled off and the residue fractionated under vacuum. 40 grams of the new ester of B.P. 110° C./0.01 mm. Hg are thus obtained. Yield: 70 percent of the theoretical.

The compound thus obtained is identical with the one obtained according to Example 1.

Example 21

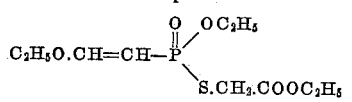

55 grams of β-ethoxyvinyl-thionophosphonic acid ethyl ester chloride are dissolved in 125 grams of anhydrous alcohol. 30 millilitres of water are added thereto and then a solution of 29 grams of potassium hydroxide in 60 millilitres of water. The mixture is heated to 70° C. for a further 2 hours and 32 grams of monochloracetic acid ethyl ester are then added. The mixture is heated with further stirring to 75° C. for a further 1-2 hours. It is then cooled to room temperature and poured into 300 millilitres of ice water. The separated oil is taken up with 300 millilitres of benzene. The benzene solution is washed twice with 50 millilitre-portions of a 4 percent sodium bicarbonate solution. The benzenic solution is then dried over sodium sulphate. By fractionating 38 grams of the new ester of B.P. 115° C./0.01 mm. Hg are obtained. Yield: 54 percent of the theoretical. The new ester is a water-insoluble colourless oil.

Example 22

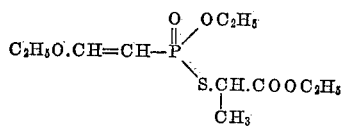

55 grams of β-ethoxyvinyl-thionophosphonic acid ethyl ester chloride are dissolved in 125 millilitres of anhydrous alcohol. 30 millilitres of water are added thereto and then a solution of 29 grams of potassium hydroxide in 60 millilitres of water. The mixture is heated to 75° C. for a further 2 hours and 47 grams of β-bromopropionic acid ethyl ester are then added. The mixture is heated with further stirring at 75° C. for 2 hours and then worked up as described in Example 6. 40 grams of the new ester of B.P. 120° C./0.01 mm. Hg are thus obtained. Yield: 54 percent of the theoretical. The ester is a colourless water-insoluble oil.

*Example 23*

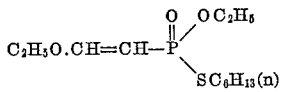

55 grams of β-ethoxyvinyl-thionophosphonic acid ethyl ester chloride are dissolved in 125 millilitres of anhydrous alcohol. 30 millilitres of water are added thereto with stirring and then a solution of 29 grams of potassium hydroxide in 60 millilitres of water. The mixture is heated to 75° C. for 2 hours and 55 grams of n-hexyliodide are then added. The temperature is kept at 75° C. with stirring for a further 3 hours and then worked up as described in Example 6. 35 grams of the new ester of B.P. 110°/0.01 mm. Hg are thus obtained. Yield: 50 percent of the theoretical.

*Example 24*

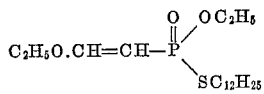

55 grams of β-ethoxyvinyl-thionophosphonic acid ethyl ester chloride are dissolved in 125 millilitres of 98 percent alcohol. 30 millilitres of water are added thereto and then a solution of 30 grams of potassium hydroxide in 60 millilitres of water. The mixture is heated with stirring to 75° C. for 2 hours and 74 grams of dodecyliodide are then added. The mixture is heated at 75° C. for a further 4 hours and then worked up as described in Example 6. 55 grams of the new ester of B.P. 160° C./0.01 mm. Hg are thus obtained. Yield: 60 percent of the theoretical.

*Example 25*

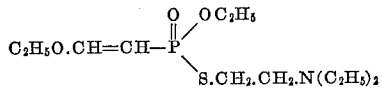

55 grams of β-ethoxyvinylthionophosphonic acid ethyl ester chloride are dissolved in 125 millilitres of 98 percent alcohol. 30 millilitres of water are added thereto and then a solution of 29 grams of potassium hyroxide in 60 millilitres of water. The temperature is kept at 75° C. for a further 2 hours and 68 grams of β-diethylaminoethyl-mercaptan are then added. The reaction product is then kept at an inside temperature of 75° C. for a further 4 hours. After working up as usual, 54 grams of the new ester are obtained. Yield: 73 percent of the theoretical. The colourless barely water-soluble oil is distillable under high vacuum only with decomposition.

*Example 26*

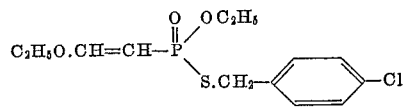

5 grams of β-ethoxyvinylthionophosphonic acid ethyl ester chloride are dissolved in 125 millilitres of 98 percent alcohol. 30 millilitres of water are added thereto and then a solution of 29 grams of potassium hydroxide in 60 millilitres of water. The temperature is kept at 75° C. for a further 2 hours and 42 grams of p-chlorobenzyl chloride are then added. The reaction mixture is kept at an internal temperature of 75° C. for a further 4 hours and then worked up in usual manner. 53 grams of the new ester are thus obtained as a pale yellow water insoluble oil. Even under high vacuum the new compound is distillable only with decomposition.

*Example 27*

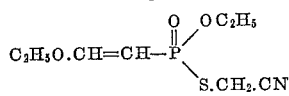

55 grams of β-ethoxyvinyl-thionophosphonic acid ethyl ester chloride are dissolved in 125 millilitres of anhydrous alcohol. 30 millilitres of water are added thereto and then a solution of 29 grams of potassium hydroxide in 60 millilitres of water. After having kept the reaction product at an internal temperature of 75° C. for 2 hours, 20 grams of chloracetonitrile are added. The mixture is kept at 75° C. for a further 4 hours and then worked up in usual manner. 45 grams of the new ester are thus obtained. Yield: 76 percent of the theoretical. The yellow water-insoluble ester is distillable only with decomposition even under high vacuum.

*Example 28*

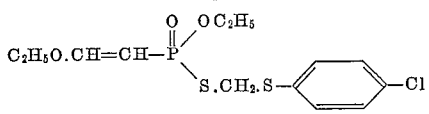

55 grams of β-ethoxyvinyl-thionophosphonic acid ethyl ester chloride are dissolved in 125 millilitres of 98 percent alcohol. 30 millilitres of water are added thereto and then a solution of 29 grams of potassium hydroxide in 60 millilitres of water. The mixture is stirred at an internal temperature of 75° C. for a further 2 hours and 50 grams of α-chloromethyl-(4-chlorophenyl)-thioether are then added. The reaction product is kept at an internal temperature of 75° C. for a further 2 hours and then worked up in usual manner. 78 grams of the new ester are thus obtained as a pale yellow water-insoluble oil. Yield: 89 percent of the theoretical.

*Example 29*

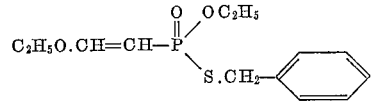

55 grams of β-ethoxyvinyl-thionophosphonic acid ethyl ester chloride are dissolved in 125 millilitres of 98 percent alcohol. 30 millilitres of water are added then and then a solution of 29 grams of potassium hydroxide in 60 millilitres of water. The mixture is stirred at an internal temperature of 75° C. for a further 2 hours and 32 grams of benzyl chloride are then added. The mixture is thereupon heated at 75° C. for a further 2 hours. After working up as usual, 37 grams of the new ester of B.P. 130° C/0.01 mm. Hg are obtained. Yield: 52 percent of the theoretical. The new ester is a pale yellow water-insoluble oil.

By the same way but using instead of β-ethoxyvinyl-thionophosphonic acid ethyl ester chloride the equimolecular amount of the β-n-butoxyvinyl-thionophosphonic acid ethyl ester chloride there is obtained the ester of the following formula

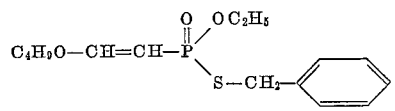

*Example 30*

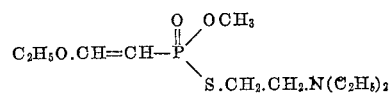

53 grams of β-ethoxyvinyl-thionophosphonic acid methyl ester chloride are dissolved in 130 milliliters of methanol. 30 millilitres of water are added thereto and then a potassium hydroxide solution of 29 grams of potassium hydroxide in 60 millilitres of water. The mixture is heated to the boil for 2 hours and 25 grams of β-diethylaminoethyl chloride are then added. The reaction product is then further heated to the boil for 2 hours. After working up as usual, 17 grams of the new ester are obtained as a yellowish brown-water-insoluble oil. Yield: 25 percent of the theoretical.

*Example 31*

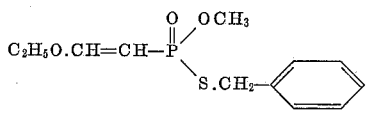

53 grams of β-ethoxyvinyl-thionophosphonic acid methyl ester chloride (B.P. 55° C./0.01 mm. Hg) are dissolved in 130 millilitres of methanol. 30 millilitres of water are added thereto and then a solution of 29 grams of potassium hydroxide in 60 millilitres of water. The water is heated to 70° C. for 2 hours and 33 grams of benzyl chloride are then added. The reaction product is afterstirred at 70–75° C. for a further 2 hours and then poured into water. The separated oil is taken up with benzene, washed neutral and dried. After distilling off the solvent, 38 grams of the new ester are obtained as a pale yellow water-insoluble oil. Yield: 56 percent of the theoretical.

*Example 32*

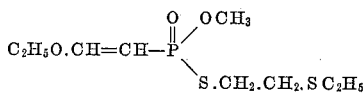

53 grams of β-ethoxyvinyl-thionophosphonic acid methly ester chloride are dissolved in 130 millilitres of methanol. 30 millilitres of water are added thereto and then a solution of 29 grams of potassium hydroxide in 60 millilitres of water. The mixture is heated to 70–75° C. for 2 hours and 32 grams of β-chlorethylthioethyl ether are then added. The reaction product is kept at 70–75° C. for a further 2 hours and then worked up in usual manner. 32 grams of the new ester are thus obtained as a yellow water-insoluble oil. Yield: 48 percent of the theoretical.

*Example 33*

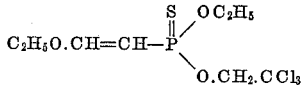

38 grams of trichlorethylalcohol are dissolved in 22 grams of anhydrous pyridine. 55 grams of β-ethoxyvinyl-thionophosphonic acid ethyl ester chloride (B.P. 60° C./0.01 mm. Hg) are added thereto with stirring. The temperature is kept at 45–50° C. for 8 hours and the mixture is then poured into 200 millilitres of ice-water to which 20 millilitres of dilute hydrochloric acid have been added. The separated oil is taken up with benzene and neutralised with sodium bicarbonate. The benzene solution is dried over sodium sulphate and then fractionated. 35 grams of the new ester of B.P. 105° C./0.01 mm. Hg are then obtained. Yield: 43 percent of the theoretical.

*Example 34*

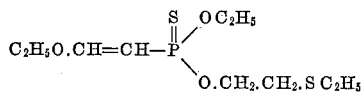

To a suspension of 30 grams of anhydrous ground potassium carbonate in 130 grams of ethyl methyl ketone there are added with stirring 22 grams of β-ethyl mercapto ethanol. 45 grams of β-ethoxyvinyl-thionophosphonic acid ethyl ester chloride are added at an internal temperature of 75° C. with further stirring. The reaction product is heated to 75–80° C. for 3–4 hours and then cooled to room temperature. The reaction product is poured into 300 millilitres of water. The precipitated oil is taken up with 200 millilitres of benzene. The benzene solution is washed twice with 50-millilitre portions of water and then dried over sodium sulphate. After distilling off the solvent under vacuum, 38 grams of the new ester remain behind as a colourless water-insoluble oil. B.P. 110° C./0.01 mm. Hg. Yield: 67 percent of the theoretical. Toxicity on rats per os $DL_{50}$: 100 milligrams per kilogram.

Spider mites are killed completely with 0.01% solutions. 0.1% solutions have a systemic action on aphides.

*Example 35*

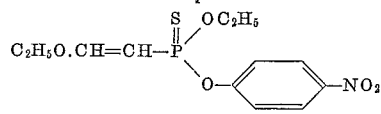

27 grams of p-nitrophenol are dissolved in 200 millilitres of anhydrous ethyl alcohol. 45 grams of a sodium ethylate solution containing ⅕ mol of sodium are added thereto with stirring. The mixture is stirred at 25–30° C. for half an hour and 43 grams of β-ethoxyvinyl-thionophosphonic acid ethyl ester chloride are then added at 30° C. with further stirring. After a short time the reaction product shows a neutral reaction. The reaction product is then poured into 300 millilitres of water and the precipitated oil is taken up with benzene. The benzene solution is washed twice with 25 millilitre portions of water and then dried over sodium sulphate. On fractionating, 50 grams of the new ester of B.P. 85° C./0.01 mm. Hg are obtained. Toxicity on rats per os $DL_{50}$: 25 milligrams per kilogram.

Aphides are destroyed with certainty with 0.001% solutions. The new ester kills spider mites completely at a concentration of 0.001%. Moreover, the new ester has a strong ovicidal action on the eggs of red spiders.

*Example 36*

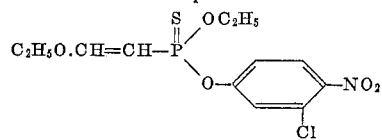

43 grams of 3-chloro-4-nitrophenol are dissolved in 150 millilitres of ethyl methyl ketone. 40 grams of dry ground potassium carbonate are added to this solution. The mixture is heated with stirring to an internal temperature of 75° C. and 55 grams of β-ethoxyvinyl-thionophosphonic acid ethyl ester chloride are added at this temperature. The mixture is heated at 75–80° C. for a further 4 hours and then worked up in usual manner. After distilling off the solvent, 57 grams of the new ester are obtained as a pale yellow water-insoluble oil. The ester is distillable only with decomposition, even under high vacuum. Yield: 65 percent of the theoretical.

*Example 37*

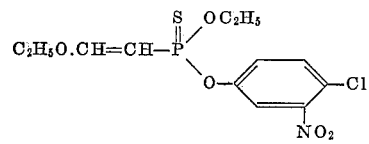

43 grams of 4-chloro-3-nitrophenyl are dissolved in 150 millilitres of ethyl methyl ketone. 40 grams of dry and ground potassium carbonate are added thereto. 55 grams of β-ethoxyvinyl-thionophosphonic acid ethyl ester chloride are added dropwise at an internal temperature of 75° C. and the mixture is then heated at 75–80° C. for a further 4 hours. After working up as usual, 46 grams of the new ester are obtained as a yellow water-insoluble oil which is not distillable even under high vacuum. Yield: 52 percent of the theoretical.

*Example 38*

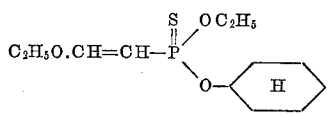

6 grams of powdered sodium are suspended in 50 millilitres of benzene. 27 grams of cyclohexanol are added thereto with stirring at 50° C. The mixture is heated at 50° C. for an hour. The sodium has then dissolved. 55 grams of β-ethoxyvinyl-thionophosphonic acid ethyl ester chloride are then added with further stirring at 50–55° C. The reaction product is heated at 50–55° C. for another hour and then worked up in usual manner. 50 grams of the new ester are thus obtained as a pale yellow water-insoluble oil of B.P. 105° C./0.01 mm. Hg. Yield: 72 percent of the theoretical.

*Example 39*

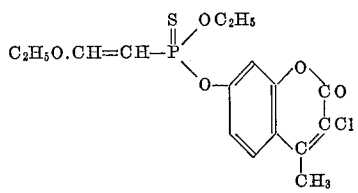

52 grams of 3-chloro-4-methyl-7-hydroxycoumarin are dissolved in 150 millilitres of ethyl methyl ketone. 40 grams of dry and screened potassium carbonate are added therto. 55 grams of β-ethoxyvinyl-thionophosphonic acid ethyl ester chloride are added with stirring at 75° C. to the suspension. The mixture is heated to an internal temperature of 75–80° C. for 12 hours and then worked up in usual manner. 50 grams of the new ester are thus obtained as colourless crystalline needles melting at 76° C. Yield: 52 percent of the theoretical.

*Example 40*

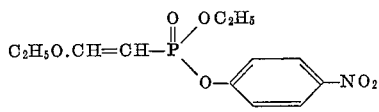

35 grams of p-nitrophenol are dissolved in 150 millilitres of ethyl methyl ketone. 40 grams of dry and screened potassium carbonate are then added with stirring. 50 grams of β-ethoxyvinyl-phosphonic acid ethyl ester chloride (B.P. 70° C./0.05 mm. Hg) are then added dropwise at an internal temperature of 75° C. The mixture is heated at 75–80° C. for a further 4–5 hours and then worked up in usual manner. 51 grams of the new ester are thus obtained as a yellow water-insoluble oil. Yield: 68 percent of the theoretical. The ester boils under a pressure of 0.01 mm. Hg at 135° C. Toxicity on rats per os $DL_{50}$: 25 milligrams per kilogram. 0.01% solutions kill Colorado beetles with certainty. 0.01% solutions destroy aphides.

*Example 41*

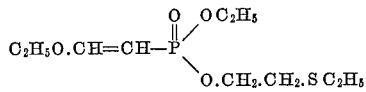

6 grams of powdered sodium are suspended in 100 millilitres of benzene. 60 grams of β-ethoxy ethanol are added with stirring at 45° C. The sodium is then dissolved. 50 grams of β-ethoxyvinylphosphonic acid ethyl ester chloride are then added with further stirring at 0 to +10° C. The mixture is stirred at 10° C. for a further hour and then poured in 200 millilitres of water. After working up as usual, 47 grams of the new ester of B.P. 108° C./0.01 mm. Hg are obtained. Yield: 70 percent of the theoretical. Toxicity on rats per os $DL_{50}$: 1000 milligrams per kilogram.

*Example 42*

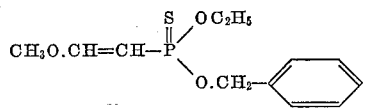

30 grams of powdered sodium are suspended in 100 millilitres of benzene. 30 grams of benzyl alcohol are added with stirring to this suspension at 50° C. The mixture is stirred for a further 2 hours. The sodium is then dissolved. 27 grams of β-methoxyvinyl-thionophosphonic acid ethyl ester chloride (B.P. 55° C./0.01 mm. Hg) are added at 50° C. to the solution thus obtained. The mixture is heated at 50° C. for another hour, then cooled to room temperature and poured into 300 millilitres of ice-water. The separated oil is taken up with benzene, separated from water and dried. On fractionating, 26 grams of the new ester are obtained as a pale yellow water-insoluble oil of B.P. 115° C./0.01 mm. Hg. Yield: 76 percent of the theoretical.

By the same way but using the equimolecular amount of β-n-propoxyvinyl-thionophosphonic acid ethyl ester chloride instead of β-methoxyvinyl-thionophosphonic acid ethyl ester chloride there is obtained the following compound

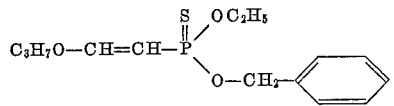

*Example 43*

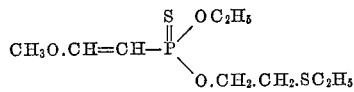

28 grams of β-oxethyl-thioethylether are suspended in 150 millilitres of methyl ethyl ketone with the addition of 40 grams of anhydrous powdered potassium carbonate and of 1 gram of powdered cooper. 53 grams of β-methoxyvinyl-thionophosphonic acid ethylester chloride are added with stirring at 80° C. to this suspension there. The mixture is kept at 80° C. with stirring for a further 4 hours and then worked up in usual manner. 55 grams of the new ester are thus obtained as a water-insoluble yellow oil. Yield: 81 percent of the theoretical.

In a concentration of 0.1 percent, the ester shows a marked systemic action on aphids.

*Example 44*

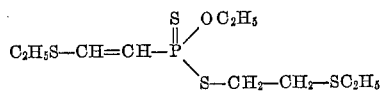

36 grams of β-ethylmercapto-ethylmercaptan (B.P. 67° C./12 mm. Hg) are dissolved in 100 millilitres of anhydrous ethanol. At 30° C. there is added while stirring a sodium ethylate solution in ethanol containing ¼ mol of sodium. At the same temperature there are added 59 grams of β-ethylmercapto-vinyl-thionophosphonic acid ethyl ester chloride. The temperature is kept for 1 futher hour and the mixture is worked up in the usual manner. There are obtained 62 grams of the new ester boiling at 0.01 mm. Hg at 118° C. The new ester is a colourless and water-insoluble oil. The yield amounts 87 percent of the theoretical. The toxicity on rats is 100 mg./kg. $LD_{50}$.

*Example 45*

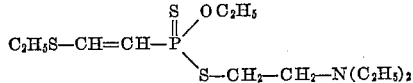

34 grams of β-diethylamino-ethylmercaptan (B.P. 54° C./10 mm. Hg) are dissolved in 100 millilitres of anhydrous alcohol. There is added at 30° C. a sodium ethylate solution in anhydrous alcohol containing ¼ mol of sodium. At the same temperature there are added dropwise while stirring 59 grams of β-ethylmercapto-vinyl-thionophosphonic acid ethylester chloride. The same temperature is kept for 1 further hour and the mixture is worked up in the usual manner. There are obtained 77 grams of the new ester of the above shown formula as a slightly yellow water-insoluble oil. The yield is 94 percent of the theoretical. The new ester is undistillable even in high vacuum. The toxicity on rats orally is 25 mg./kg. $LD_{95}$.

*Example 46*

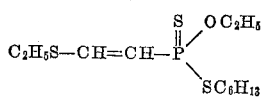

30 grams of n-hexylmercaptan are dissolved in 100 cc. of anhydrous alcohol. There is added at 30° C. a sodium ethylate solution containing ¼ mol of anhydrous sodium. At the same temperature and while stirring there are added 59 grams of β-ethylmercapto-vinyl-thionophosphonic acid ethylester chloride. The temperature is kept for 1 further hour and the mixture is worked up in the usual manner. There are obtained 57 grams of the new ester as a colourless water-insoluble oil, boiling at 104° C./0.01 mm. Hg. Yield 73 percent of the theoretical.

*Example 47*

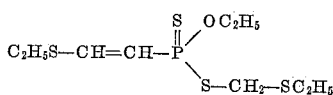

28 grams of α-methylmercapto-thioethyl ether (B.P. 50° C./12 mm. Hg) are dissolved in 100 millilitres of anhydrous alcohol. There is added while stirring and at a temperature of 30° C. a solution of sodium ethylate containing ¼ mol of anhydrous sodium. Thereafter are added while stirring at the same temperature 60 grams of β-ethyl-mercapto-vinyl-thionophosphonic acid-ethyl-ester chloride. The temperature is kept for 1½ hours at 30° C. and the mixture worked up as usual. There are obtained 74 percent of the new ester as a water-insoluble light brown oil. Yield 98 percent of the theoretical. The toxicity on rats orally is 100 mg./kg. $LD_{95}$.

*Example 48*

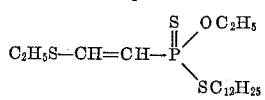

51 grams of dodecyl mercaptan are dissolved in 100 millilitres of anhydrous alcohol. There is added at 30° C. a solution of sodium ethylate containing ¼ mol of anhydrous sodium. Thereafter there are added dropwise at the same temperature 59 grams of β-ethylmercapto-vinyl-thiono-phosphonic acid ethyl ester chloride. The temperature is kept for 1 further hour while stirring and the mixture is worked up in the usual manner. There are obtained 85 grams of the new ester as a yellow water-insoluble oil. Yield 86 percent of the theoretical.

*Example 49*

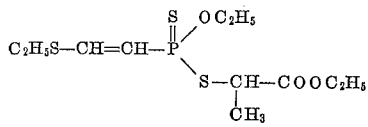

34 grams of α-sulfhydryl propionic acid ethyl ester (B.P. 48° C./11 mm. Hg) are dissolved in 100 millilitres of anhydrous alcohol. There is added while stirring and at a temperature of 30° C. a solution of sodium ethylate containing ¼ mol of anhydrous sodium. Thereafter there are added at the same temperature 59 grams of β-ethyl mercapto-vinyl-thionophosphonic acid ethyl ester chloride. The temperature is kept for 2 further hours and the mixture is worked up in the usual manner. There are obtained 66 grams of the new ester as a yellow water-insoluble oil. Yield 80% of the theoretical. The toxicity on rats orally is 500 mg./kg. $LD_{95}$.

*Example 50*

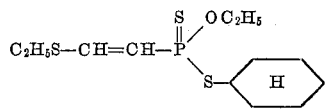

29 grams of cyclohexyl mercaptan are dissolved in 100 millilitres of anhydrous alcohol. There is added to this solution a solution of sodium ethylate containing ¼ mol of sodium. Thereafter there are added while stirring and at a temperature of 30° C. 59 grams of β-ethyl mercapto-vinyl-thionophosphonic acid ethyl ester chloride. The temperature is kept for further 2 hours and the mixture then is worked up as usual. There are obtained 65 grams of the new ester as a light brown water-insoluble oil. Yield 83 percent of the theoretical.

*Example 51*

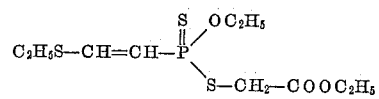

30 grams of thioglycol acid ethyl ester are dissolved in 100 millilitres of anhydrous alcohol. At 30° C. there is added a solution of sodium ethylate containing ¼ mol of sodium. Thereafter there are added dropwise 59 grams of β-ethylmercapto-vinyl-thionophosphonic acid ethyl ester chloride. The temperature is kept for 2 further hours at 30° C. and the mixture is worked up in a usual manner. There are obtained 60 grams of the new ester as a yellow water-insoluble oil. Yield 76 percent of the theoretical. The toxicity on rats orally is 500 mg./kg. $LD_{50}$.

*Example 52*

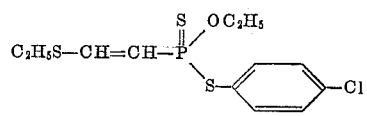

38 grams of p-chloro phenol mercaptan are dissolved in 120 millilitres of anhydrous alcohol. Thereto is added while stirring a solution of sodium ethylate containing ¼ mol of sodium. Thereafter there are added dropwise while stirring and at a temperature of 30° C. 60 grams of β-ethylmercapto-vinyl-thionophosphonic acid ethyl ester chloride. The temperature is kept for further 2 hours at 30° C. and the mixture is then worked up in a usual manner. There are obtained 68 grams of the new ester as a yellow water-insoluble oil. Yield 80 percent of the theoretical.

*Example 53*

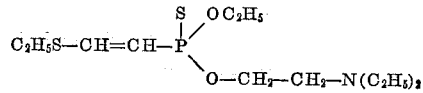

6 grams of sodium powder are suspended into 100 millilitres of dry benzene. At 50° C. there are added while stirring 60 grams of diethyl amino ethanol. After about 2 hours of stirring at said temperature the sodium has been converted into a corresponding alcoholate. While stirring there are added 60 grams of β-ethyl mercapto vinyl-thionophosphonic acid ethyl ester chloride. After stirring for 1 further hour at 60° C. the mixture is poured into 400 millilitres of ice-water. The oil which precipitates is taken up in 200 millilitres of benzene. The benzenic layer is dried over anhydrous sodium sulphate and the benzene then is distilled off. There are obtained 50 grams of the new ester as a colourless water-insoluble oil which distils at 0.01 mm. Hg at 118° C. The yield is 64 percent of the theoretical. The toxicity on rats orally is 10 mg./kg. $LD_{50}$.

*Example 54*

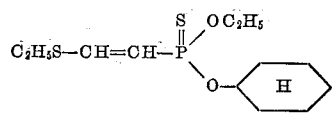

6 grams of sodium powder are suspended in 100 millilitres of benzene. At 50° C. there are added 40 grams of cyclohexanol. After stirring for 2 hours at 50° C. the sodium has been converted into a corresponding alcoholate. Thereafter there are added while stirring and at a temperature of 50° C. 60 grams of β-ethylmercapto-vinyl-thionophosphonic acid ethyl ester chloride. The temperature is kept at 60° C. for 1 further hour and the mixture is worked up then as described in the foregoing example. There are obtained 42 grams of the new ester as a pale yellow water-insoluble oil (B.P. 108° C./0.01 mm. Hg). Yield 57 percent of the theoretical.

*Example 55*

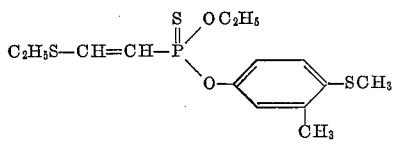

39 grams of 4-methyl mercapto-3-methylphenol (M.P. 59° C.) are dissolved in 70 millilitres of benzene. This solution is added at 50° C. and while stirring to a suspension of 6 grams of sodium powder in 150 millilitres of benzene. After conversion of the sodium into a corresponding alcoholate there are added while stirring at 60° C. 60 grams of β-ethyl mercapto-vinyl-thionophosphonic acid ethyl ester chloride. The temperature is kept for 1 further hour at 60° C. and the mixture then is worked up as described in the foregoing examples. There are obtained 70 grams of water-insoluble yellow oil. Yield 81 percent of the theoretical. The new ester is undistillable even in high vacuum.

*Example 56*

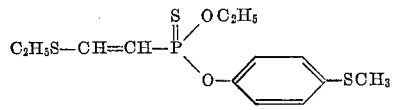

35 grams of p-methylmercapto phenol (M.P. 87° C.) are dissolved in 70 millilitres of benzene. This solution is added while stirring to a suspension of 6 grams of sodium powder in 100 millilitres of benzene at 60° C. After reaction of the sodium there are added while stirring at the same temperature 60 grams of β-ethylmercapto-vinyl-thionophosphonic acid ethyl ester chloride. The temperature is kept for 1 further hour at 60° C. and the mixture is worked up as usual. The product obtained is kept at a temperature of 80° C. under vacuum of 0.01 mm. There are obtained 53 grams of a yellow water-insoluble oil. Yield 64 percent of the theoretical.

*Example 57*

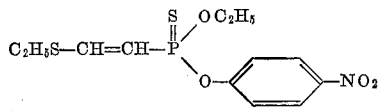

40 grams of the sodium salt of nitrophenol are dissolved in 150 millilitres of ethyl methyl ketone. There are added while stirring at 40° C. 60 grams of β-ethylmercapto-vinyl-thionophosphonic acid ethyl ester chloride. The temperature is kept for 1 further hour at 40° C. and the mixture then is worked up as usual. The raw product obtained is distilled off at 80° C. under a pressure of 0.01 mm. There are obtained 59 grams of the new ester as a yellowish brown water-insoluble oil. Yield 71 percent of the theoretical. The new ester is undistillable even in high vacuum.

*Example 58*

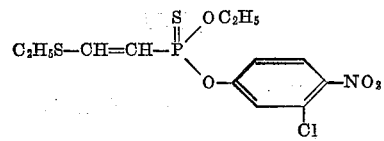

43 grams of 3-chloro-4-nitrophenol are dissolved in 100 millilitres of anhydrous alcohol. To this solution there is added while stirring a solution of sodium ethylate containing ¼ mol of sodium. Thereby the temperature rises to 45° C. Thereafter there are added dropwise while stirring at 50° C. 60 grams of β-ethyl mercapto-vinyl-thionophosphonic acid ethyl ester chloride. The temperature is kept at 50° C. for further 2 hours and then the mixture is worked up in usual manner. There are obtained 55 grams of the new ester as a water-insoluble yellowish-brown oil, which is kept at a temperature of 80° C. for a short period under vacuum of 0.01 mm. Yield 60 percent of the theoretical.

*Example 59*

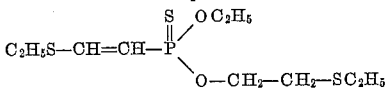

28 grams of β-ethylmercapto ethanol are dissolved in 150 millilitres of methyl ethyl ketone. To this solution there are added while stirring 40 grams of dried and finely divided potassium carbonate and 1 gram of copper powder. Thereafter while stirring there are added dropwise at 80° C. 60 grams of ethyl marcapto-vinyl-thionophosphonic acid ethyl ester chloride. The temperature is kept at 80° C. while stirring for further 4 hours, then the reaction product is diluted with 500 millilitres of chloroform and the resulting salts are filtered off with suction. The mixture is worked up in a usual manner. There are obtained 45 grams of the new ester as a yellow water-insoluble oil, which is kept shortly at a temperature of 60° C. and under vacuum of 0.01 mm. Yield 60 percent of the theoretical.

*Example 60*

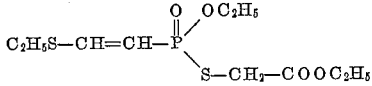

60 grams of β-ethylmercapto-vinyl-thionophosphonic acid ethyl ester chloride are dissolved in 120 millilitres of anhydrous alcohol. While stirring there are added 20 millilitres of water. The temperature rises to 70° C. Then there is added dropwise at 70° C. a solution of 29 grams of potassium hydroxide and 60 millilitres of water. The temperature is kept for further 2 hours at 70° C. and thereafter there are added 32 grams of monochloro acetic acid ethyl ester. The temperature is kept for 2 further hours at 70° C. and the mixture is worked up as usual. There are obtained 40 grams of the new ester as a yellow water-insoluble oil (B.P. 108° C./0.01 mm. Hg). Yield 54 percent of the theoretical.

*Example 61*

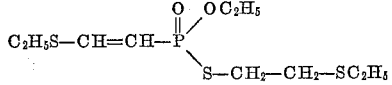

60 grams of β-ethyl mercapto-vinyl-thionophosphonic acid ethyl ester chloride together with 120 millilitres of anhydrous alcohol, 20 millilitres of water and a solution of 29 grams of potassium hydroxide in 60 millilitres of water are saponified exactly as described in the foregoing example. After saponification there are added while stirring at 70° C. 32 grams of β-chloroethyl thioethyl ether. The temperature is kept for 2 hours at 70° C. and the mixture is worked up in a usual manner. There are obtained 44 grams of the new ester as a light yellow water-insoluble oil (B.P. 114° C./0.01 mm. Hg). Yield 59 percent of the theoretical. The toxicity on rats orally is 10 mg./kg. $LD_{50}$.

*Example 62*

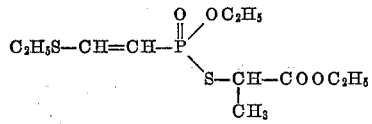

60 grams of β-ethylmercapto-vinyl-thionophosphonic acid ethyl ester chloride are saponified as described in the foregoing examples. To the saponification product there are added 47 grams of α-bromopropionic acid ethyl ester chloride. The temperature is kept at 70° C. for further 2 hours, and the mixture is worked up as usual. There are obtained 32 grams of the new ester as a yellow water-insoluble oil. The new ester is undistillable even in high vacuum. The toxicity on rats orally is 50 mg./kg. LD$_{95}$.

*Example 63*

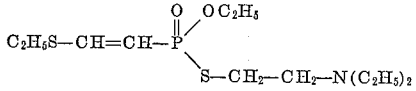

60 grams of β-ethylmercapto-vinyl-thionophosphonic acid ethyl ester chloride are saponified as described in the foregoing examples. To the saponification product there are added while stirring and at a temperature of 70° C. 35 grams of β-chloroethyl diethylamine. The temperature is kept for further 2 hours at 70° C. and the mixture is worked up in usual manner. After lower boiling impurities have been distilled off under reduced pressure there are obtained 30 grams of the new ester as a yellow water-insoluble oil. Yield 39 percent of the theoretical. The toxicity on rats orally is 10 mg./kg. LD$_{50}$.

*Example 64*

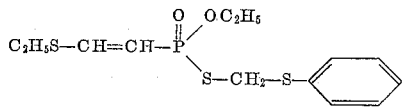

60 grams of β-ethylmercapto-vinyl-thionophosphonic acid ethyl ester chloride are saponified as described in the aforegoing examples. To the saponification product there are added while stirring at 70° C. 40 grams of α-chloromethyl thiophenylether. The temperature is kept for further 2 hours at 70° C. and the mixture is worked up as usual. The water-insoluble yellow raw product obtained is kept shortly under pressure of 0.01 mm. at a temperature of 80° C. There are obtained 49 grams of the new ester. Yield 59 percent of the theoretical. The toxicity on rats orally is 25 mg./kg. LD$_{50}$.

*Example 65*

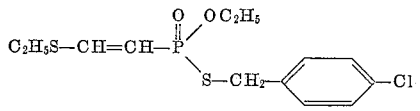

60 grams of β-ethylmercapto-vinyl-thionophosphonic acid ethyl ester chloride are saponified as usual. To this solution there are added dropwise while stirring and at a temperature of 70–80° C. 42 grams of p-chlorobenzyl chloride. The temperature is kept at 70° C. for further 2 hours and the mixture then is worked up as usual. The raw product obtained is kept shortly under a pressure of 0.01 mm. at a temperature of 75° C. There are obtained 55 grams of the new ester. Yield 65 percent of the theoretical.

*Example 66*

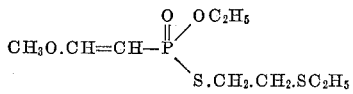

53 grams of β-methoxyvinyl-thionophosphonic acid ethyl ester chloride are dissolved in 130 millilitres of anhydrous alcohol. 30 millilitres of water are added thereto and then a solution of 29 grams of potassium hydroxide in 60 millilitres of water. The mixture is kept at 75° C. with stirring and 32 grams of β-chloroethyl thioethylether are then added dropwise. The temperature is maintained at 75° C. with further stirring for a further 3 hours and the product is then worked up in usual manner. 50 grams of the new ester of B.P. 90° C./0.01 mm. Hg are thus obtained. Yield: 74 percent of the theoretical. The ester is sparingly water-soluble.

Spider mites are completely killed by 0.01% solutions of this ester.

*Example 67*

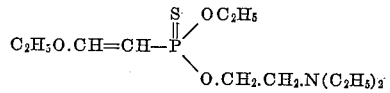

6 grams of sodium powder are suspended in 50 millilitres of benzene. 60 grams of diethylamino-ethanol are added with stirring at 50° C. After the sodium is dissolved, 55 grams of β-ethoxyvinyl-phosphonic acid ethyl ester chloride (B.P. 60° C./0.01 mm. Hg) are added dropwise with stirring. The mixture is after-stirred for an hour and then worked up in usual manner. 64 grams of the new ester of B.P. 114° C./0.01 mm. Hg are thus obtained. Yield: 86 percent of the theoretical.

0.01% solutions of the ester have a marked ovicidal action on the ovae of red spiders.

*Example 68*

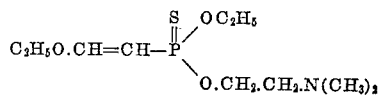

6 grams of sodium powder are suspended in 100 millilitres of benzene. 50 grams of dimethylamino-ethanol are added with stirring at 50° C. The mixture is heated at 50° C. for a further hour and 55 grams of β-ethoxyvinyl-thiono-phosphonic acid ethyl ester chloride are added at this temperature. The reaction product is kept at 60° C. for a further hour and then poured into 300 millilitres of water. The separated oil is taken up with plenty of benzene, the benzenic layer is separated and dried. The solvent is removed under vacuum. 32 grams of the new ester are thus obtained. Yield: 49 percent of the theoretical.

*Example 69*

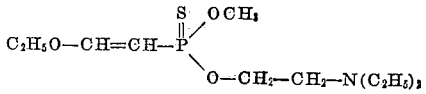

6 grams of sodium powder are suspended in 100 millilitres of benzene. 50 grams of diethylamino-ethanol are added thereto with stirring at 50° C. The mixture is after-stirred at 50° C. for half an hour. The sodium dissolves. 53 grams of β-ethoxyvinyl-thionophosphonic acid methyl ester chloride (B.P. 55° C./0.01 mm. Hg) are then added with stirring at the said temperature. The reaction product is after-stirred for an hour, then diluted with 300 millilitres of benzene and poured into 300 millilitres of ice-water. The benzenic layer is separated, dried over sodium sulphate and the filtrate is fractionated. 67 grams of the new ester of B.P. 80° C./0.01 mm. Hg are thus obtained. Yield: 94 percent of the theoretical.

*Example 70*

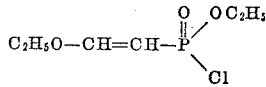

83 grams of β-ethoxy-vinyl-phosphonic acid diethyl ester (B.P. 70° C./0.01 mm. Hg) are reacted at 65° C. with phosgene. Reaction is carried out in such way that the temperature is kept at 65 to 70° C. When the reaction temperature no longer can be maintained by introducing phosgene the reaction mixture is heated for 1 further hour at 70° C. The reaction product is distilled in vacuum. There are obtained 33 grams of the ester chloride distilling at 70° C./0.05 mm. Hg. Yield 45 percent of the theoretical.

From the following table there is to be seen the activity of some of the inventive compounds of the above shown examples:

COMPOUND

| Example | | |
|---|---|---|
| Example 17 | rat per os | LD₉₅ 50 mg./kg. |
| | spider mites | 0.001% 40% |
| | aphids | 0.01% 100% |
| Example 18 | rat per os | LD₅₀ 50 mg./kg. |
| | spider mites | 0.1% 100% |
| | aphids | 0.1% 100% |
| Example 19 | rat per os | LD₉₅ 100 mg./kg. |
| | caterpillars | 0.1% 100% |
| | aphids (syst. act.) | 0.1% 100% |
| Example 20 | rat per os | LD₉₅ 25 mg./kg. |
| | spider mites | 0.01% 100% |
| | aphids | 0.001% 50% |
| Example 21 | rat per os | LD₅₀ 50 mg./kg. |
| | spider mites | 0.01% 100% |
| | flies | 0.001% 100% |
| Example 22 | rat per os | LD₅₀ 50 mg./kg. |
| | flies | 0.001% 100% |
| | aphids (syst. act.) | 0.1% 100% |
| Example 23 | rat per os | LD₉₅ 250 mg./kg. |
| | spider mites | 0.1% 100% |
| | aphids (syst. act.) | 0.1% 100% |
| Example 24 | rat per os | LD₅₀ 1,000 mg./kg. |
| | spider mites | 0.1% 100% |
| | aphids (syst. act.) | 0.1% 100% |
| Example 25 | rat per os | LD₅₀ 10 mg./kg. |
| | spider mites | 0.01% 100% |
| | aphids | 0.01% 100% |
| Example 26 | rat per os | LD₅₀ 250 mg./kg. |
| | spider mites | 0.1% 100% |
| | caterpillars | 0.1% 100% |
| Example 27 | rat per os | LD₅₀ 2.5 mg./kg. |
| | aphids | 0.001% 90% |
| | spider mites | 0.01% 100% |
| Example 28 | rat per os | LD₅₀ 50 mg./kg. |
| | aphids | 0.01% 100% |
| | spider mites | 0.01% 100% |
| Example 29 | rat per os | LD₉₅ 500 mg./kg. |
| | spider mites | 0.1% 100% |
| | aphids (syst. act.) | 0.1% 100% |
| Example 30 | spider mites | 0.001% 100% |
| | caterpillars | 0.1% 100% |
| Example 31 | aphids (syst. act.) | 0.1% 100% |
| | caterpillars | 0.1% 100% |
| Example 32 | aphids | 0.001% 100% |
| | spider mites | 0.001% 90% |
| Example 44 | aphids | 0.1% 100% |
| | spider mites | 0.01% 100% |
| Example 45 | aphids | 0.01% 100% |
| | aphids (syst. act.) | 0.1% 100% |
| Example 49 | flies | 0.01% 50% |
| | caterpillars | 0.1% 100% |
| Example 50 | caterpillars | 0.1% 100% |
| Example 51 | aphids | 0.1% 100% |
| | caterpillars | 0.01% 100% |
| Example 52 | rat per os | LD₉₅ 250 mg./kg. |
| | aphids | 0.1% 100% |
| | spider mites | 0.01% 50% |
| Example 53 | aphids | 0.01% 100% |
| | spider mites | 0.1% 100% |
| Example 55 | aphids | 0.1% 100% |
| | flies | 0.01% 50% |
| Example 56 | rat per os | LD₅₀ 100 mg./kg. |
| Example 57 | rat per os | LD₅₀ 250 mg./kg. |
| | aphids | 0.01% 50% |
| | spider mites | 0.01% 50% |
| Example 58 | rat per os | LD₅₀ 500 mg./kg. |
| | aphids | 0.1% 100% |
| | spider mites | 0.01% 70% |
| Example 59 | rat per os | LD₅₀ 100 mg./kg. |
| | aphids | 0.1% 100% |
| | spider mites | 0.01% 100% |
| Example 60 | rat per os | LD₉₅ 100 mg./kg. |
| | aphids | 0.1% 100% |
| | caterpillars | 0.1% 100% |
| Example 61 | rat per os | LD₅₀ 10 mg./kg. |
| | aphids | 0.01% 100% |
| | spider mites | 0.01% 75% |
| Example 62 | rat per os | LD₉₅ 50 mg./kg. |
| | aphids | 0.1% 100% |
| | caterpillars | 0.1% 100% |
| Example 63 | rat per os | LD₅₀ 10 mg./kg. |
| | aphids | 0.01% 100% |
| | aphids (syst. act.) | 0.1% 100% |
| Example 65 | rat per os | LD₉₅ 500 mg./kg. |
| | aphids | 0.1% 100% |
| | spider mites | 0.01% 60% |

I claim:

1. A phosphonic acid ester of the following formula

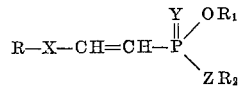

in which R and R₁ stand for lower alkyl radicals up to 4 carbon atoms, R₂ stands for a member selected from the group consisting of lower alkyl mercapto substituted lower alkyl, lower dialkyl amino substituted lower alkyl, lower carbalkoxy substituted lower alkyl, cyano substituted lower alkyl, chlorine substituted lower alkyl, phenyl substituted lower alkyl, chlorophenyl substituted lower alkyl, phenyl mercapto substituted lower alkyl, chlorophenyl mercapto substituted lower alkyl, cyclohexyl, phenyl, chloro substituted phenyl, nitro substituted phenyl, lower alkyl mercapto substituted phenyl, lower alkyl substituted phenyl, and chromanyl, and X, Y and Z stand for a chalcogen which has an atomic weight from 16 to 33, at least one of the chalcogens Y and Z being sulfur.

2. A phosphonic acid ester of claim 1 wherein X is sulfur.

3. A phosphonic acid ester of claim 1 wherein X, Y and Z are sulfur.

4. A phosphonic acid ester of claim 1 wherein X and Z are sulfur and Y is oxygen.

5. A phosphonic acid ester of claim 1 wherein X and Y are sulfur and Z is oxygen.

6. A phosphonic acid ester of claim 1 wherein X is oxygen.

7. A phosphonic acid ester of claim 1 wherein X is oxygen and Y and Z are sulfur.

8. A phosphonic acid ester of claim 1 wherein X and Y are oxygen and Z is sulfur.

9. A phosphonic acid ester of claim 1 wherein X and Z are oxygen and Y is sulfur.

10. A phosphonic acid ester of the following formula:

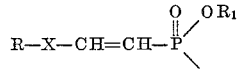

in which R and R₁ stand for lower alkyl radicals up to 4 carbon atoms, R₂ stands for a member selected from the group consisting of lower alkyl mercapto substituted lower alkyl, lower dialkyl amino substituted lower alkyl, lower carbalkoxy substituted lower alkyl, cyano substituted lower alkyl, chlorine substituted lower alkyl, phenyl substituted lower alkyl, chlorophenyl substituted lower alkyl, phenyl mercapto substituted, lower alkyl, chlorophenyl mercapto substituted lower alkyl, cyclohexyl, phenyl, chloro substituted phenyl, nitro substituted phenyl, lower alkyl mercapto substituted phenyl, lower alkyl substituted phenyl, and chromanyl; and X is a chalcogen having an atomic weight from 16 to 33.

11. A phosphonic acid ester of claim 10 wherein X is sulfur.

References Cited in the file of this patent

Anisimov et al.: Chem. Abst., 50, 3217 (1956).
Anisimov et al.: Chem. Abst., 50, 6297 (1956).
Anisimov et al.: Chem. Abst., 50, 7077 (1956).
Anisimov et al.: Chem. Abst., 50, 9319 (1956).
Anisimov et al.: Chem. Abst., 50, 13,784–5 (1956).